us011975645B2

(12) United States Patent
Kathol et al.

(10) Patent No.: US 11,975,645 B2
(45) Date of Patent: May 7, 2024

(54) VEHICLE INCLUDING DRINK HOLDER

(71) Applicant: KAWASAKI MOTORS, LTD., Akashi (JP)

(72) Inventors: Bradley Kathol, Lincoln, NE (US); Naoki Hashimoto, Akashi (JP); Akira Kinoshita, Akashi (JP)

(73) Assignee: KAWASAKI MOTORS, LTD., Akashi (JP)

( * ) Notice: Subject to any disclaimer, the term of this patent is extended or adjusted under 35 U.S.C. 154(b) by 0 days.

(21) Appl. No.: 18/058,496

(22) Filed: Nov. 23, 2022

(65) Prior Publication Data
US 2024/0025326 A1 Jan. 25, 2024

Related U.S. Application Data

(60) Provisional application No. 63/390,859, filed on Jul. 20, 2022.

(51) Int. Cl.
*B60R 7/00* (2006.01)
*B60N 3/10* (2006.01)
*B60R 11/02* (2006.01)
*B60R 11/00* (2006.01)

(52) U.S. Cl.
CPC .......... *B60N 3/101* (2013.01); *B60R 11/0241* (2013.01); *B60R 2011/0003* (2013.01)

(58) Field of Classification Search
CPC ............... B60N 3/101; B60R 11/0241; B60R 2011/0003
See application file for complete search history.

(56) References Cited

U.S. PATENT DOCUMENTS

| 6,869,120 | B2 * | 3/2005 | Johnson, Jr. | B60R 7/06 224/274 |
| 7,712,718 | B2 * | 5/2010 | Schimmeyer | B60N 3/103 220/737 |
| 7,926,862 | B2 | 4/2011 | Smith et al. | |
| 8,091,749 | B2 * | 1/2012 | Stautzenberger, Sr. | B60R 9/00 224/571 |
| 8,944,500 | B2 | 2/2015 | Oh et al. | |
| 9,428,313 | B2 * | 8/2016 | Olsen | B60N 3/108 |
| 10,059,407 | B1 * | 8/2018 | Ingalls | B63B 17/02 |
| 10,227,029 | B2 | 3/2019 | Maeda et al. | |
| 10,899,263 | B2 * | 1/2021 | Schnur | B60R 7/04 |
| 10,933,815 | B1 | 3/2021 | Khubani et al. | |
| 11,064,810 | B2 * | 7/2021 | Snir | A47C 7/624 |
| 11,142,289 | B1 * | 10/2021 | Anderson | B63B 17/02 |
| 11,414,259 | B2 * | 8/2022 | Nixon | A47J 41/0044 |
| 2017/0036585 | A1 | 2/2017 | Maeda et al. | |
| 2018/0147966 | A1 * | 5/2018 | Reed | B60J 5/0487 |
| 2018/0263394 | A1 * | 9/2018 | Thomas | A47C 11/00 |

(Continued)

*Primary Examiner* — Amy J. Sterling
(74) *Attorney, Agent, or Firm* — METROLEX IP LAW GROUP, PLLC

(57) ABSTRACT

An embodiment of the disclosure may be a vehicle that may include: a vehicle body including a floor surface; a front seat base protruded from the floor surface and including an upper surface thereof on which a front seat bottom is attached; a rear seat base protruded from the floor surface and located on a rear side of the front seat base across an aisle, wherein a rear seat bottom is attached to the rear seat base; and a drink holder fixed to a portion of the upper surface of the front seat base on a rear side of the front seat bottom.

20 Claims, 13 Drawing Sheets

(56) References Cited

U.S. PATENT DOCUMENTS

2021/0061153 A1\* 3/2021 Harima ................. B60N 3/101
2021/0237661 A1 8/2021 Stefanelli et al.
2021/0309157 A1\* 10/2021 Gentile ................. B60N 3/001

\* cited by examiner

VEHICLE INCLUDING DRINK HOLDER

BACKGROUND

The disclosure may relate to a vehicle including a drink holder.

In a related art, there has been known a vehicle equipped with drink holders that hold beverage containers. Patent document 1 (US2017/0036585) discloses a utility vehicle including a front seat, a rear seat, and a drink holder that is attached to a rear surface of a seat back of the front seat, so as to allow rear seat passengers to use the drink holder.

SUMMARY

In Patent Document 1, the drink holder that is attached to the rear surface of the seat back of the front seat may interfere with rear seat passengers when the rear seat passengers move (e.g., when the passengers get in and out of the vehicle or move left or right along the rear seat). Particularly, in a case of a vehicle such as a utility vehicle or the like that has a narrow aisle between a front seat and a rear seat, a drink holder that is attached to a back of a seat back of the front seat may interfere with rear seat passengers when the rear seat passengers move.

An object of one or more embodiments of the disclosure may be to provide a drink holder arrangement structure and a vehicle capable of improving passenger comfort.

A first aspect of the disclosure may be a vehicle. The vehicle may include: (i) a vehicle body including a floor surface; (ii) a front seat base protruded from the floor surface and including an upper surface thereof on which a front seat bottom is attached; a rear seat base protruded from the floor surface and located on a rear side of the front seat base across an aisle, wherein a rear seat bottom is attached to the rear seat base; and (iii) a drink holder fixed to a portion of the upper surface of the front seat base on a rear side of the front seat bottom.

According to the first aspect described above, the drink holder is provided on the portion of the upper surface of the front seat base on the rear side of the front seat bottom. This may prevent the drink holder from interfering with rear seat passengers when the rear seat passengers move.

DETAILED DESCRIPTION

Figure 1:
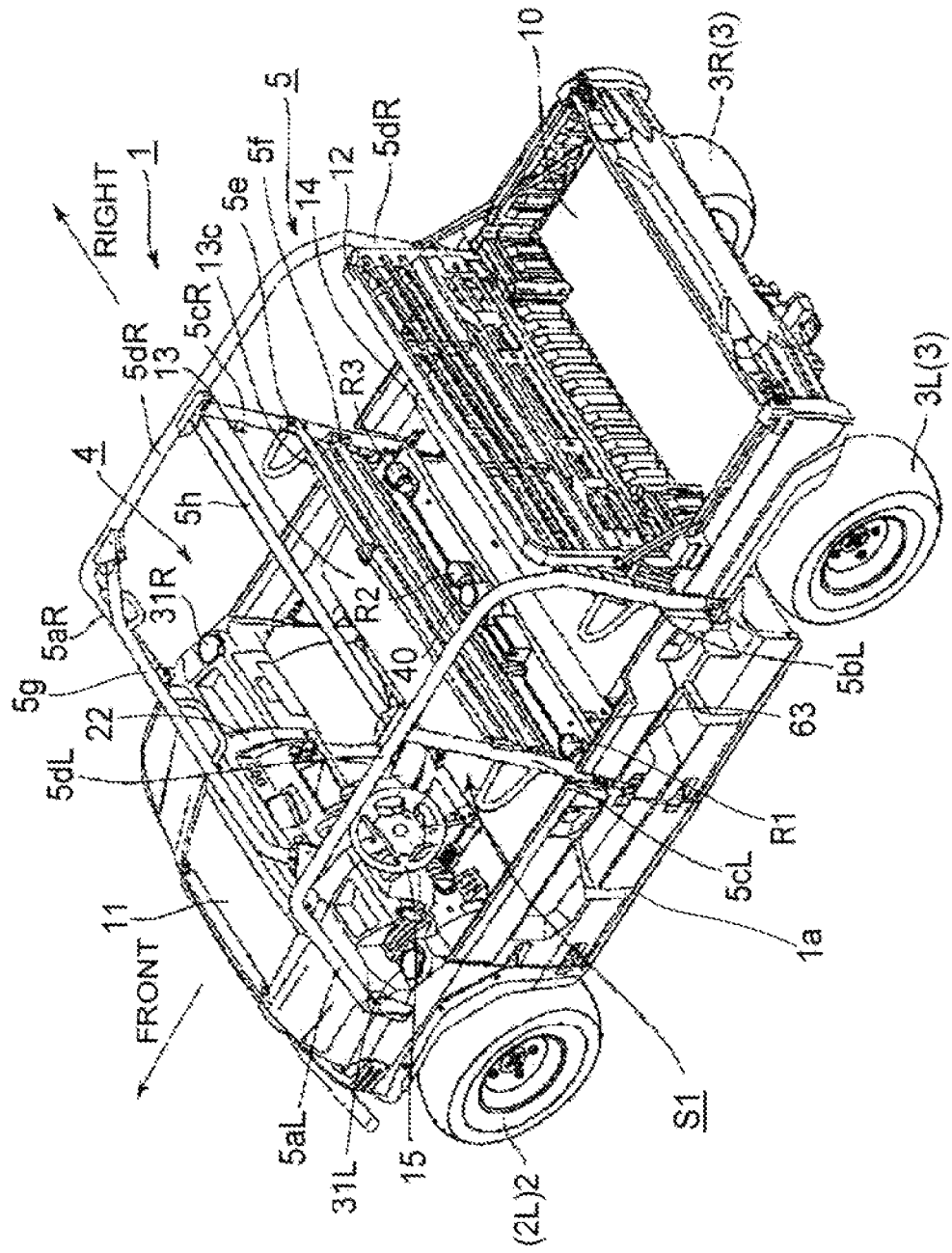
FIG. 1 is a diagram of a perspective view illustrating a utility vehicle 1 including a drink holder 40 for rear seat passengers according to an embodiment.

Descriptions are provided hereinbelow for one or more embodiments based on the drawings. In the respective drawings referenced herein, the same constituents are designated by the same reference numerals and duplicate explanation concerning the same constituents is omitted. All of the drawings are provided to illustrate the respective examples only.

(Outline of Vehicle Overall Structure)

FIG. 1 is a diagram illustrating a perspective view of a utility vehicle 1 as a vehicle including a drink holder 40 for rear seat passengers according to an embodiment. The utility vehicle 1 may travel on grass fields, gravel ground, and sandy soil, as well as on wild lands such as unpaved mountain paths or forest roads, muddy places, and craggy places. Assume that directions in the disclosure match directions viewed from a driver of the utility vehicle 1 or viewed along a traveling direction of the utility vehicle 1.

As illustrated in FIG. 1, the utility vehicle 1 includes a vehicle body 1a, a pair of right and left front wheels 2L and 2R at a front portion of the vehicle body 1a, a pair of right and left rear wheels 3L and 3R at a rear portion of the vehicle body 1a, and a passenger space (cabin) 4 between the front wheels 2L and 2R and the rear wheels 3L and 3R. The passenger space 4 is surrounded by a floor surface 21, an instrument panel 22, and a rollover protection structure (ROPS) 5.

The ROPS 5 forms a part of the body frame. The ROPS 5 includes left and right front pillar members 5aL and 5aR, left and right rear pillar members 5bL and 5bR, a left side roof member 5dR which connects an upper end of the left front pillar member 5aL and an upper end of the left rear pillar member 5bL and extends in the front-rear direction, a right side roof member 5dL which connects an upper end of the right front pillar member 5aR and an upper end of the right rear pillar member 5bR and extends in the front-rear direction, middle pillar members 5cL and 5cR which support center portions in the front-rear direction of the left and right roof members 5dR and 5dL, a front roof member 5g which connects the upper ends of the left and right front pillar members 5aL and 5aR and extends in a vehicle width direction, and an intermediate roof member 5h which connects the center portions in the front-rear direction of the left side roof member 5dL and the right side roof member 5dR.

The ROPS 5 further includes an upper cross member 5e and an intermediate cross member 5f that extend in the vehicle width direction (the left-right direction) and are connected to the left and right middle pillar members 5cL and 5cR.

The vehicle 1a includes a cargo bed 10 in back of the passenger space 4 and a hood 11 in front of the passenger space 4. Provided between the passenger space 4 and the cargo bed 10 is a screen 12 that divides the passenger space 4 and the cargo bed 10. A bench-type front seat 13 is provided in a front portion of the passenger space 4 and a bench-type rear seat 14 is provided in a rear portion of the passenger space 4. The front seat 13 includes a left side seating area S1 that serves as a driver's seat. The left seating area S1 is equipped with operation parts (manipulators), such as a steering wheel 15 and/or the like.

The upper cross member 5e is also used as a grip member to be gripped by the passengers seated in the rear seat 14. The intermediate cross member 5f is also configured to support a seat back (backrest) 13c of the front seat 13.

The front seat 13 includes a seat bottom (a seat cushion) 13b and the seat back 13c. The seat bottom 13b of the front seat 13 may be referred to as a front seat bottom, the seat back 13c of the front seat 13 may be referred to as a front seat back 13b. The front seat bottom 13b is fixed to an upper surface of a front seat base 13a, which is projected upward from the floor surface 21. The front seat back 13c is supported by the intermediate cross member 5f, as described above.

The rear seat 14 is located in back of the front seat 13 across a rear seat passenger aisle (floor surface 21b for the rear seat passengers). The rear seat 14 includes a seat bottom (a seat cushion) 14b and a seat back (a backrest) 14c. The seat bottom 14b of the rear seat 14 may be referred to as a rear seat bottom, the seat back 14c of the rear seat 14 may be referred to as a rear seat back 14c. The rear seat bottom 14b is attached to an upper surface of a rear seat base 14a, which is projected upward from the floor surface 21. The rear seat back 14c is supported by the screen 12.

(Drink Holder)

As illustrated in FIG. 1, the drink holders 31L and 31R for front seat passengers are provided on left and right sides of the instrument panel 22. A drink holder 40 for rear seat passengers is fixed on a portion of the upper surface of the front seat base 13a on the rear side of the front seat bottom 13b.

(Drink Holder for Rear Seat Passengers)

Figure 2:
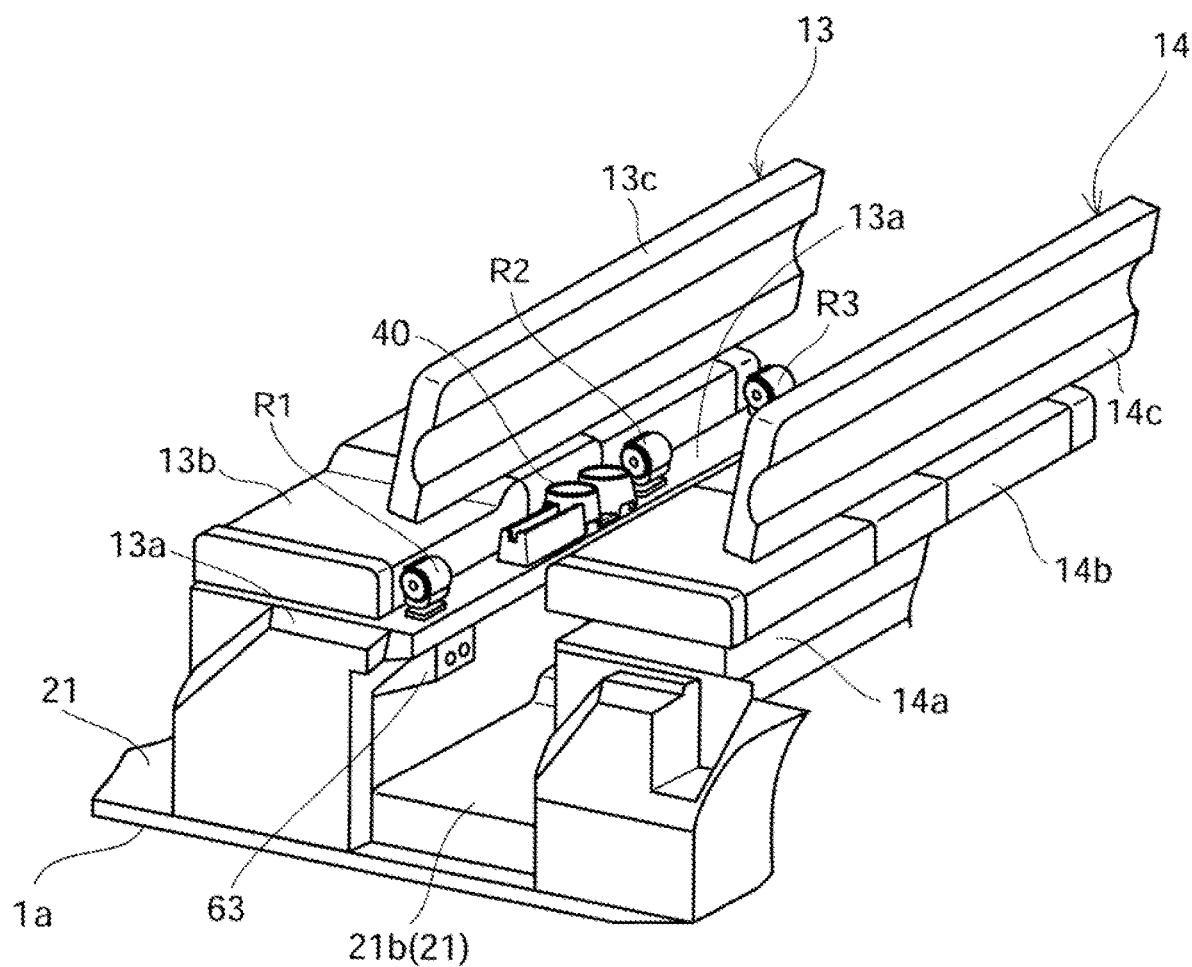
FIG. 2 is a diagram of a schematic perspective view illustrating a positional relationship among the drink holder 40, a front seat 13, and a rear seat 14.
Figure 3:
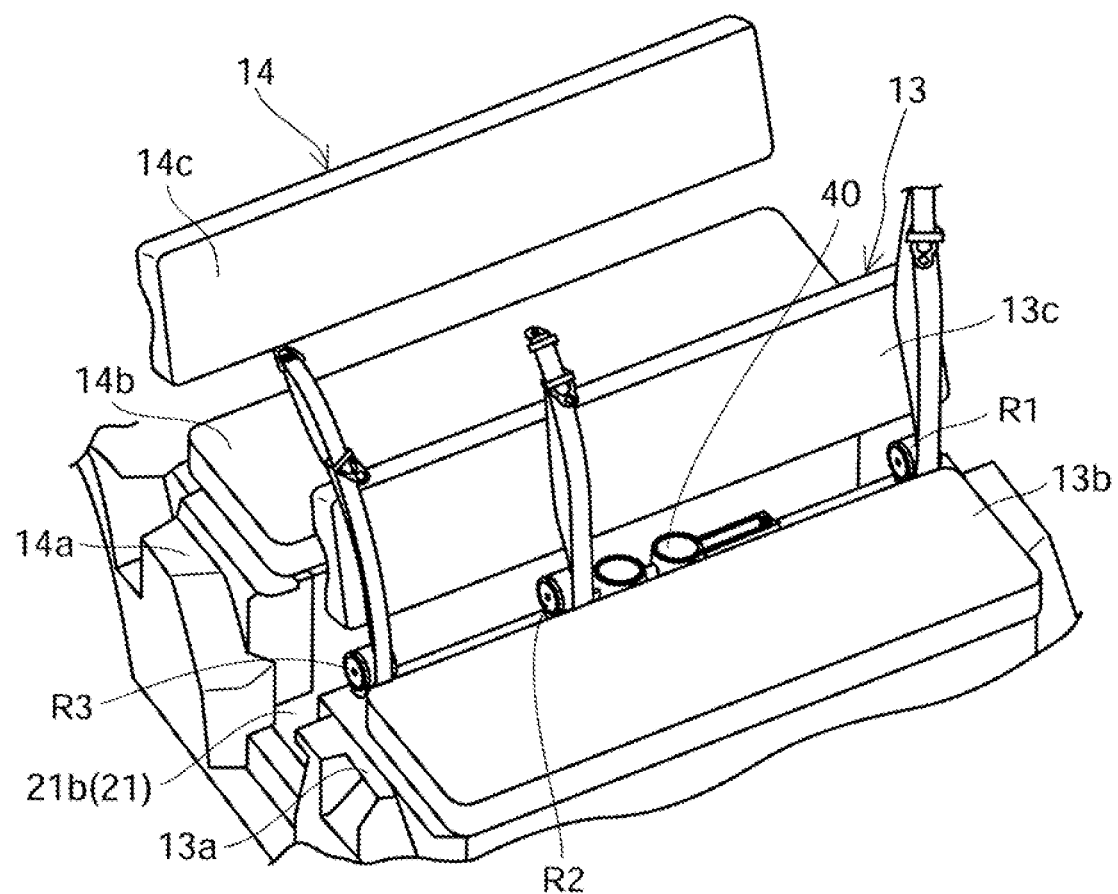
FIG. 3 is a diagram of a schematic perspective view illustrating a positional relationship between the drink holder 40 and the front seat 13.
Figure 4:
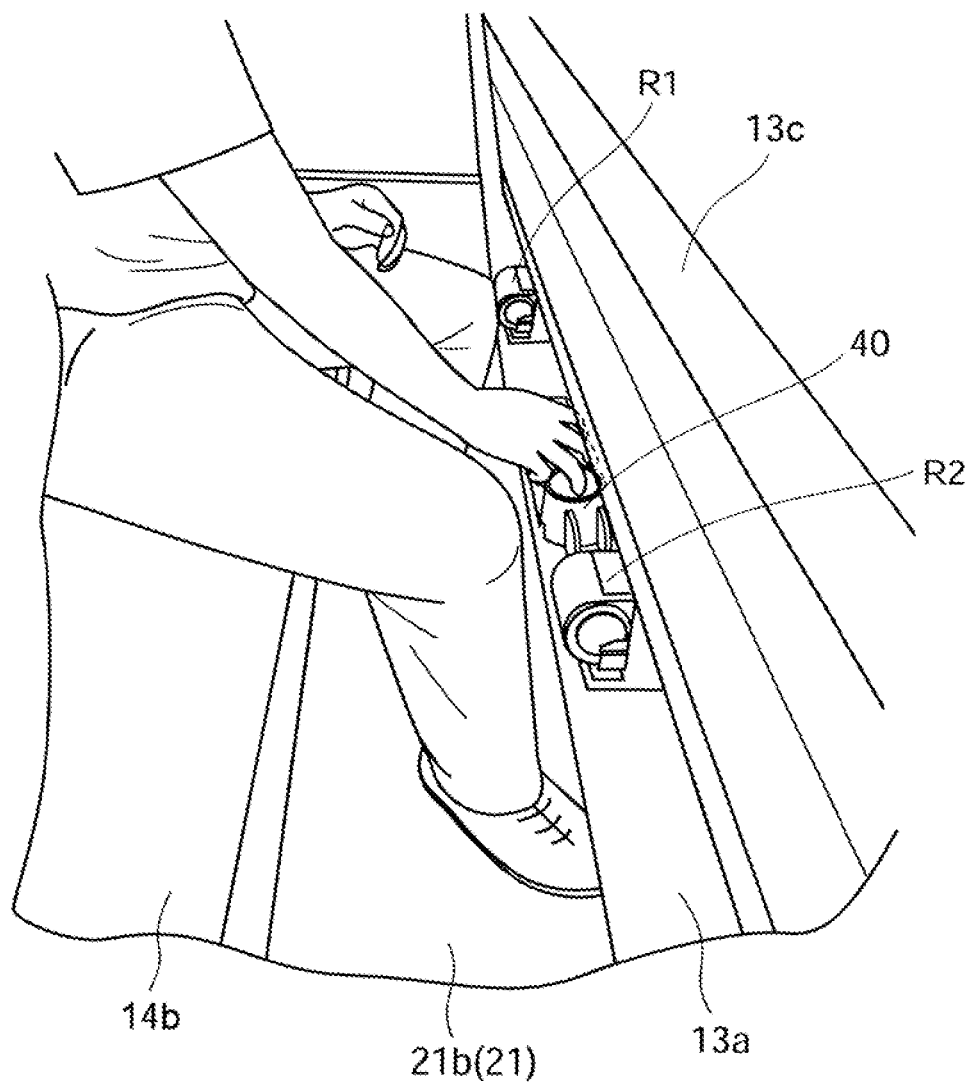
FIG. 4 is a diagram of a schematic perspective view illustrating a positional relationship between the drink holder 40 and a rear seat passenger.
Figure 5:
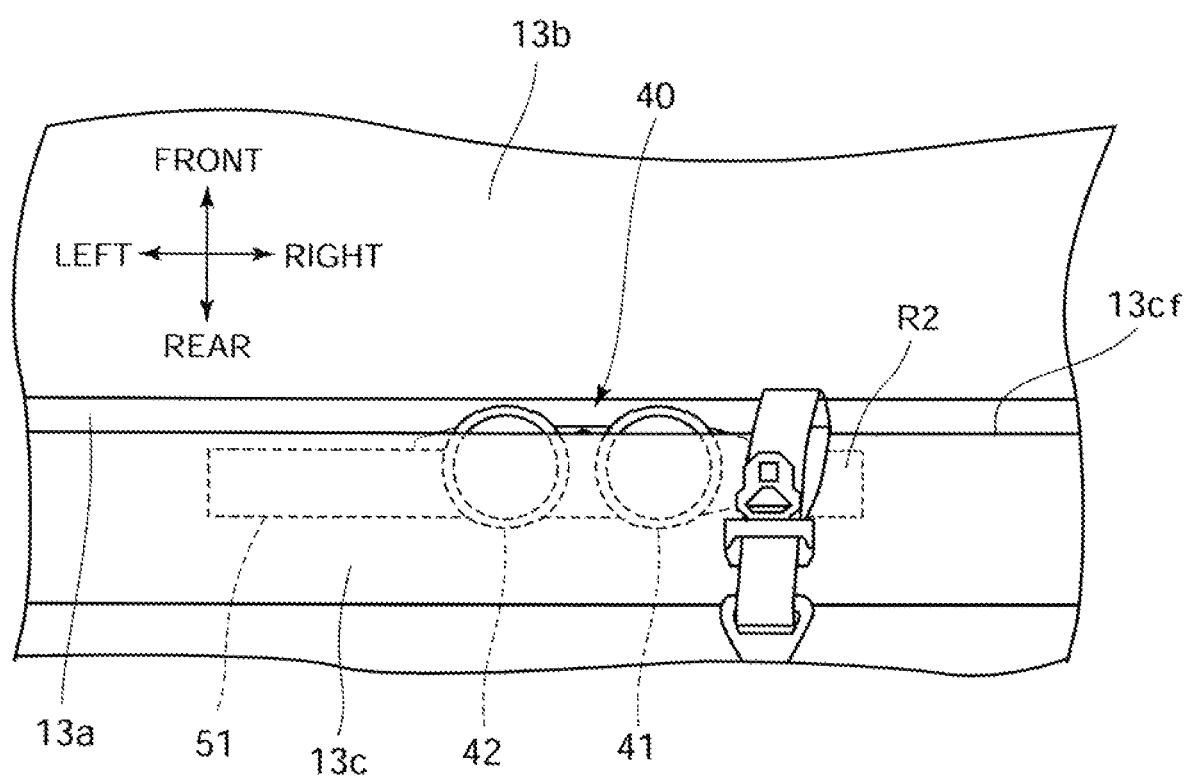
FIG. 5 is a diagram of a schematic top view illustrating a positional relationship between the drink holder 40 and a seat back 13c of the front seat.
Figure 6:
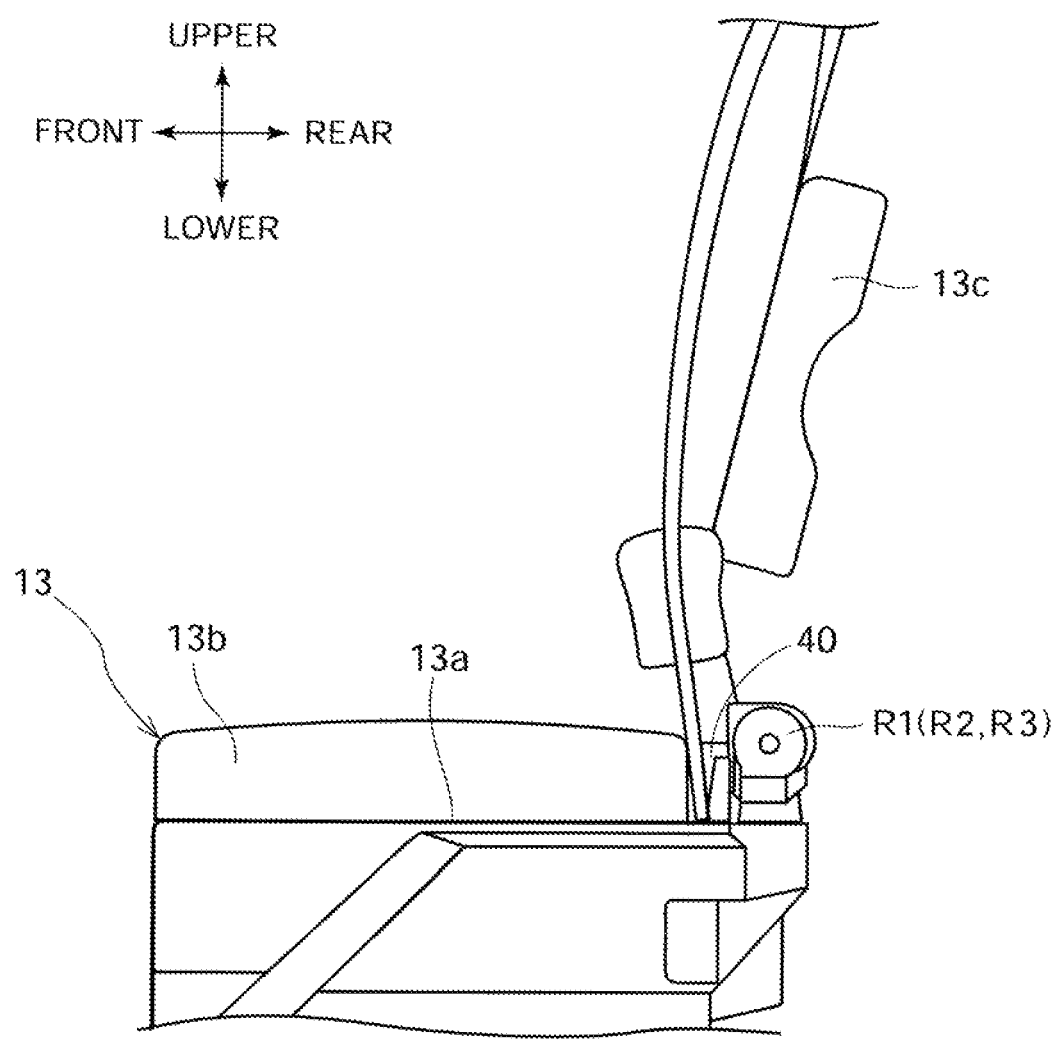
FIG. 6 is a diagram of a schematic side view illustrating a positional relationship among the drink holder 40, the front seat 13, and front seat retractors R1 (R2, R3)
Figure 7:
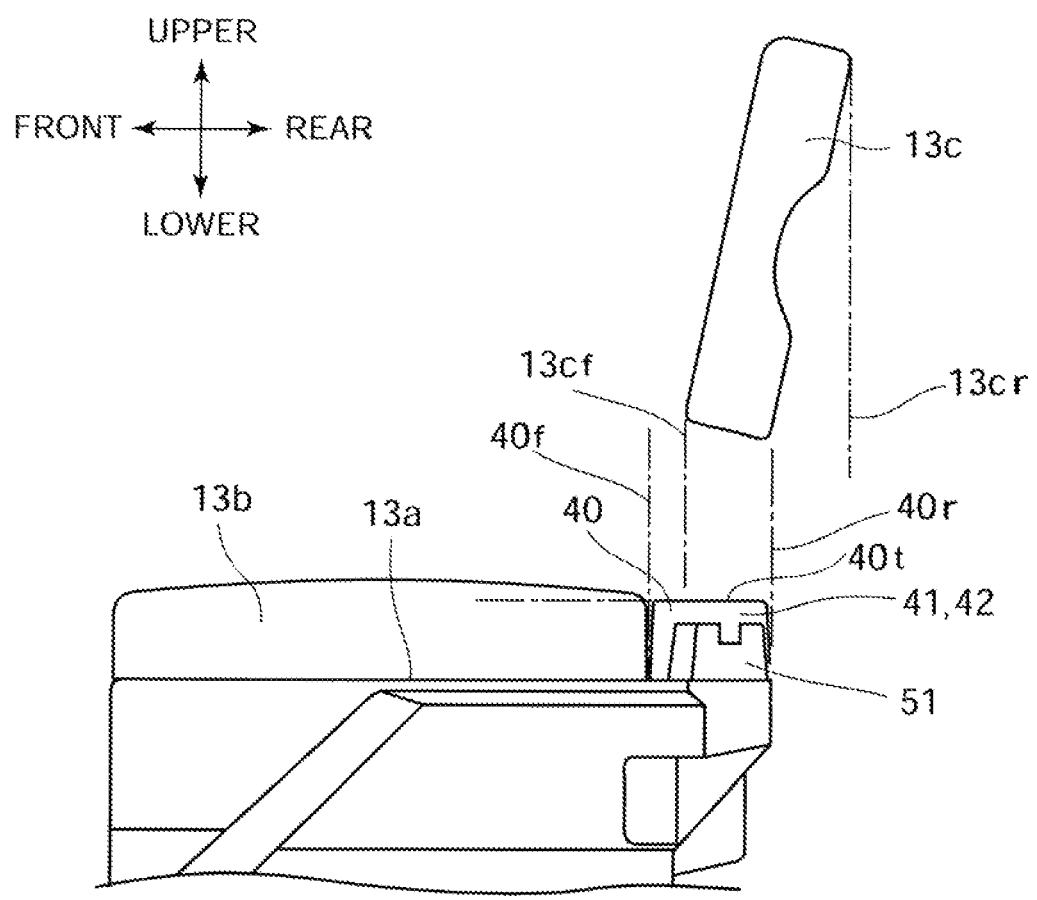
FIG. 7 is a diagram of a schematic side view illustrating a positional relationship among the drink holder 40 and a seat bottom 13b and the seat back 13c of the front seat 13.

Next, the drink holder 40 for rear seat passengers is described in detail with reference to FIGS. 2 to 14. First, an arrangement of the drink holder 40 is explained with reference to FIGS. 2 to 7. FIG. 2 is a diagram of a schematic perspective view illustrating a positional relationship among the drink holder 40 and the front seat 13 and the rear seat 14. FIG. 3 is a diagram of a schematic perspective view illustrating a positional relationship between the drink holder 40 and the front seat 13. FIG. 4 is a diagram of a schematic perspective view illustrating a positional relationship between the drink holder 40 and a rear seat passenger. FIG. 5 is a diagram of a schematic top view illustrating a positional relationship among the drink holder 40, the front seat bottom 13b, and the front seat back 13c 13. FIG. 6 is a diagram of a schematic side view illustrating a positional relationship among the drink holder 40, the front seat bottom 13b, the front seat back 13c, and a front seat retractor R1. FIG. 7 is a diagram of a schematic side view illustrating a positional relationship among the drink holder 40, the front seat bottom 13b, and the front seat back 13c.

As illustrated in FIGS. 2, 3, and 4, the drink holder 40 for rear seat passengers is provided in back of the front seat bottom 13b and fixed to the upper surface of the front seat base 13a. That is, the drink holder 40 is fixed to the portion of the upper surface of the front seat base 13a on the rear side of the front seat bottom 13b. The drink holder 40 is fixed to a middle portion of the vehicle width direction (for example, a center portion in the vehicle width direction) of the upper surface of the front seat base 13a. The drink holder 40 is located below the front seat back 13c. More specifically, in view along the front-rear direction of the vehicle, the center in the width direction of the vehicle body 1a is overlapped with at least a part of the drink holder 40.

As illustrated in FIG. 5, in view along the vertical direction, more than half of the drink holder 40, more specifically more than 70% of the drink holder 40, is overlapped with the front seat back 13c.

As illustrated in FIG. 7, with respect to the front-rear direction, a rear end 40r of the drink holder 40 is located on the front side of a rear end 13cr of the front seat back 13c. Also, with respect to the front-rear direction, a front end 40f of the drink holder 40 is located on the front side of a front end 13cf of the front seat back 13c. Since the front end 40f of the drink holder 40 is located on the front side of the front end 13cf of the front seat back 13c, a front seat passenger can also easily access a container held in the drink holder 40 through a gap between the front seat back 13c and the front seat bottom 13b (see FIG. 3).

As illustrated in FIG. 7, in the vertical direction, an upper end 40t of the drink holder 40 is located lower than an uppermost point of the upper surface of the front seat bottom 13b and is also located lower than a rear end of the upper surface of the front seat bottom 13b.

As illustrated in FIG. 6, a part of the drink holder 40 is overlapped with the front seat belt retractors R1, R2, and R3, in view along the vehicle width direction (see FIGS. 2, 3, and 4).

Figure 8:
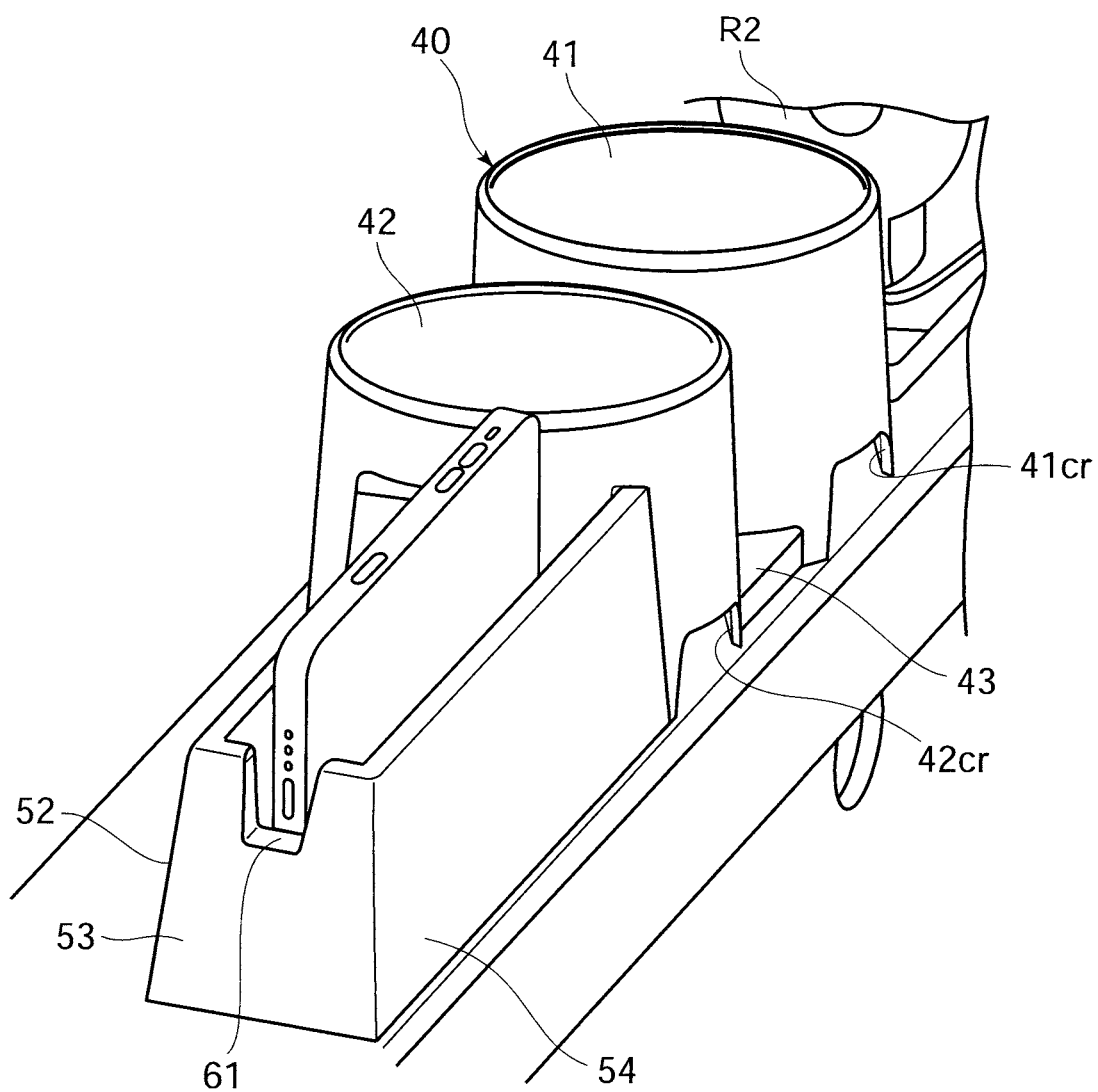
FIG. 8 is a diagram of a schematic perspective view illustrating an example of a state of use of the drink holder 40.
Figure 9:
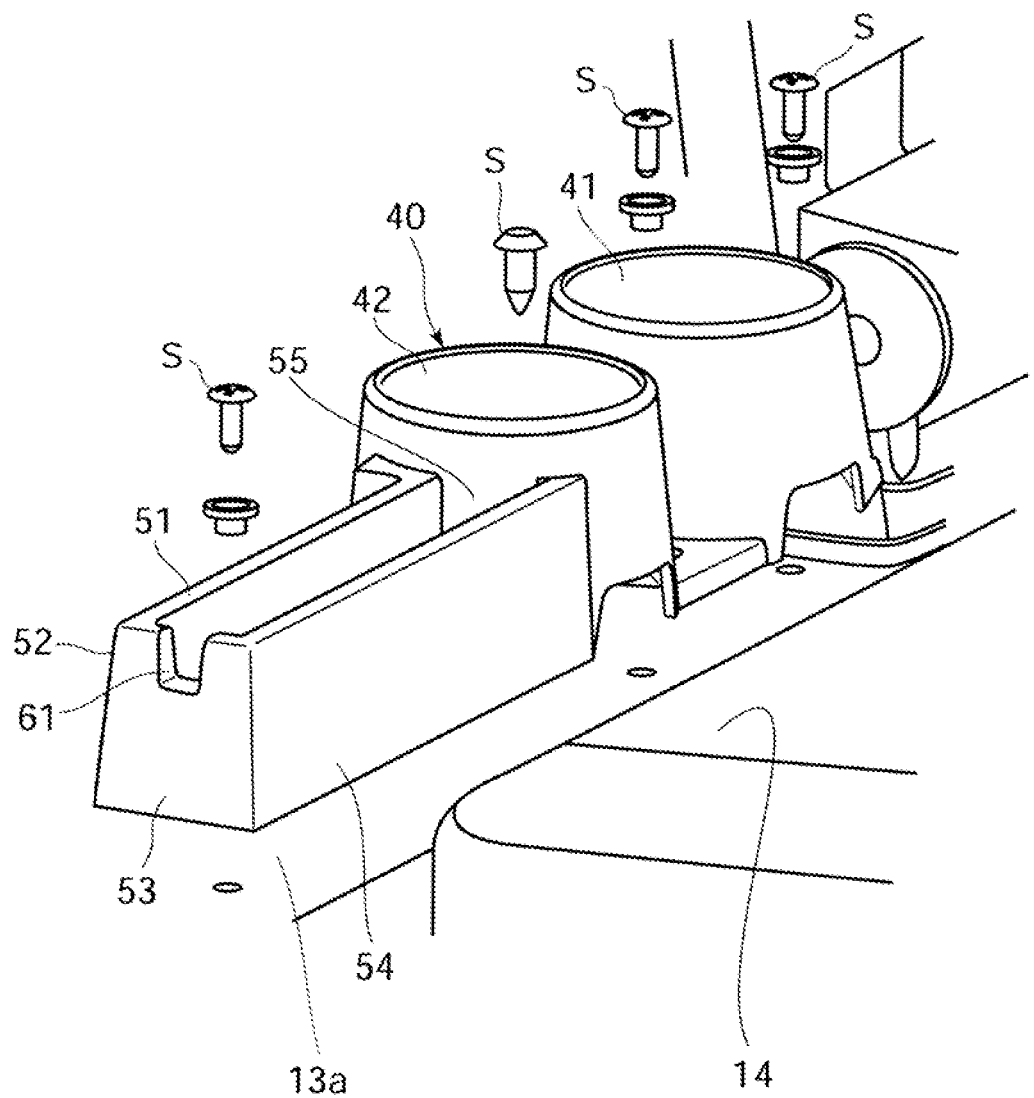
FIG. 9 is a diagram of a schematic perspective view for explaining attachment of the drink holder 40 to the utility vehicle 1 (an upper surface of a front seat base 13a)
Figure 10:
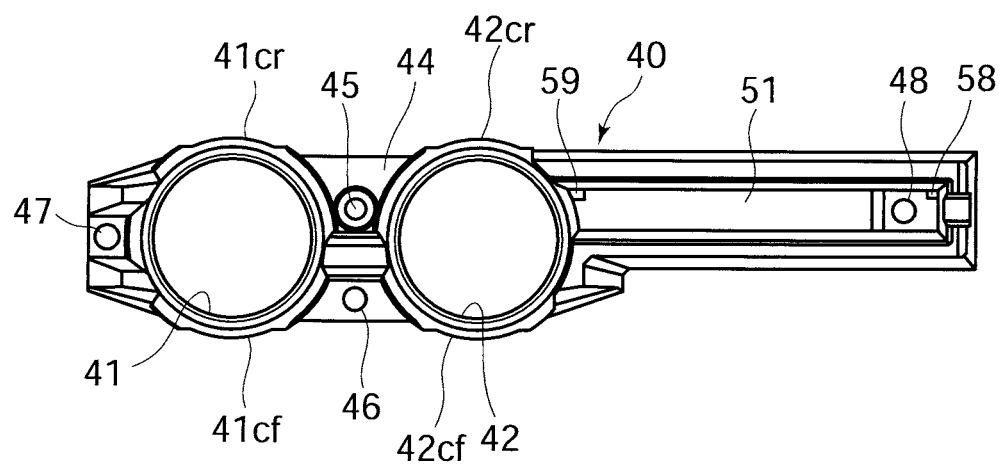
FIG. 10 is a diagram illustrating a top view of the drink holder 40.
Figure 11:
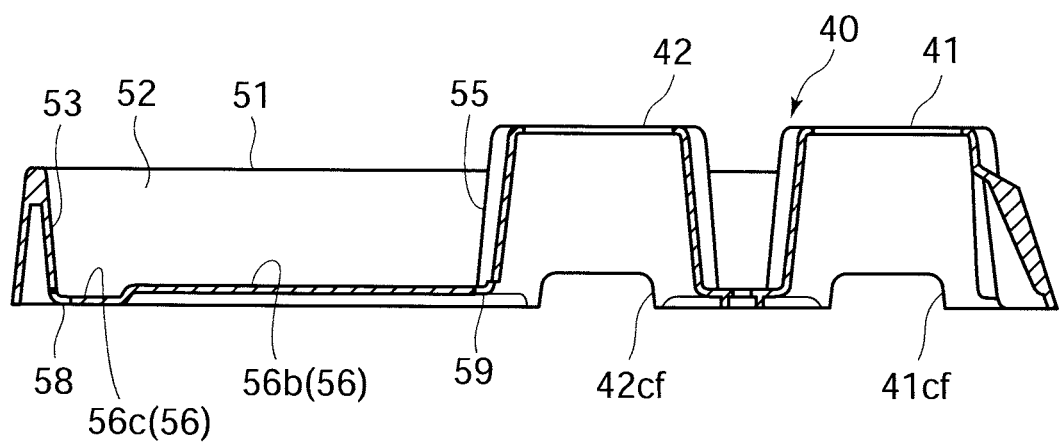
FIG. 11 is a diagram illustrating a cross sectional view of the drink holder 40.

Next, the structure of the drink holder 40 is explained with reference to FIGS. 8 to 11. FIG. 8 a diagram of a schematic perspective view illustrating an example of a state of use of the drink holder 40. FIG. 9 is a diagram of a schematic perspective view for explaining attachment of the drink holder 40 to the vehicle body 1a (the front seat base 13a). FIG. 10 is a diagram illustrating a plane view of the drink holder 40. FIG. 11 is a diagram illustrating a cross sectional view of the drink holder 40.

As illustrated in FIGS. 8 to 11, the drink holder 40 includes one or more tubular holder portions 41 and 42 each of which includes an upper end opening and a lower end opening and is configured to hold a beverage container. In an embodiment, as illustrated in FIGS. 8 to 11, the drink holder 40 includes two tubular holder portions 41 and 42. The drink holder 40 includes a connection portion 44 which connects the two tubular holder portions 41 and 42 at edges of the lower end openings of the tubular holder portions 41 and 42. The connection portion 44 includes fixation portions (e.g., including screw holes 45 and 46) which are fixed to the front seat base 13a with fixing members (e.g., screws S).

As illustrated in FIGS. 8 and 11, each of the tubular holder portions 41 and 42 has a tapered shape in which a diameter thereof is gradually enlarged from the upper end opening to the lower end opening thereof. That is, each of the tubular holder portions 41 and 42 does not have a bottom wall protruding inwardly from the vicinity of the lower end opening thereof.

As illustrated in FIGS. 8, 10, and 11, the tubular holder portions 41 and 42 have front side cutouts 41cf and 42cf at front lower end portions thereof and rear side cutouts 41*cr* and 42*cr* at rear lower end portions thereof, respectively. This shortens the size of the tubular holder portions 41 and 42 in the front-rear direction.

The front end of each of the holder portions 41 and 42, (e.g., the edges of the front side cutout 41*cf* and 42*cf*) is positioned in the vicinity of the rear end of the front seat bottom 13*b* (see FIG. 7).

As illustrated in FIGS. 8 to 11, the drink holder 40 is integrally formed with a device holder portion 51 configured to hold electronic devices and the like. The device holder portion 51 is connected to the drink holder portion 42. The device holder portion 51 is formed in a container shape including a bottom wall 56 and four side walls 52, 53, 54, and 55 with an upper end opening defined by the side walls 52, 53, 54, and 55. Note that the side wall 55 is a part of a circumferential wall of the tubular holder portion 42.

The bottom wall 56 of the device holder portion 51 includes one or more drain holes 58 and 59, as illustrated in FIG. 11. The bottom wall 56 of the device holder portion 51 includes a first bottom wall portion 56*b* at a first height and a second bottom wall portion 56*c* at a second height lower than the first height, and the second bottom wall portion 56*c* includes the drain hole 58. Further, the drain holes 58 and 59 provided in the bottom wall 56 are located at the boundary portion between the bottom wall 56 and the side wall 52, 53, 54, or 55, so that liquid such as water that has fallen along the side wall can be discharged through the drain holes immediately below the side wall.

The device holder portion 51 has a notch 61 recessed from a peripheral edge of the upper end opening thereof, as illustrated in FIGS. 8 and 9. The notch 61 is provided in one side wall 53 among the four side walls 52, 53, and 54, and 55 of the device holder 51 that is provided on the side closer to a power outlet 63 (e.g., a DC socket, a cigar socket, an USB plug) as a cable connection port provided at the front seat base 13*a*.

(Rotation Mechanism for Rotating Rear Seat Bottom)

Figure 12:
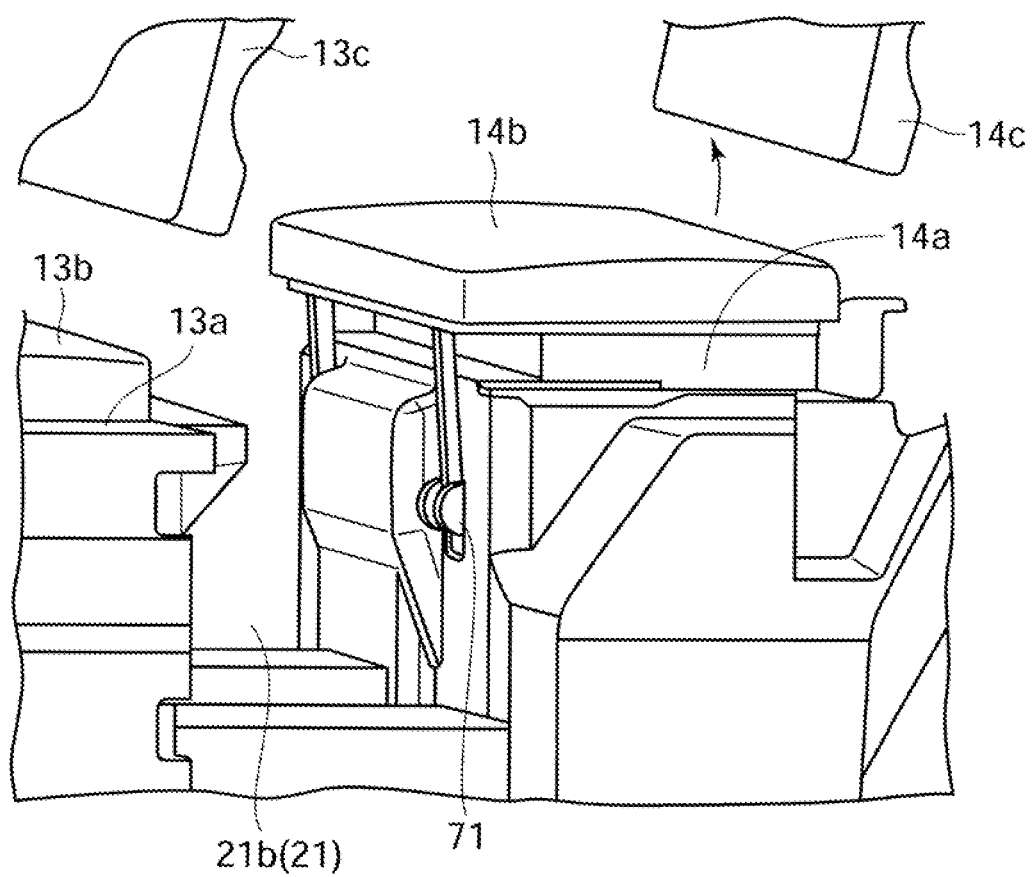
FIG. 12 is a diagram of a schematic perspective view illustrating a rotation mechanism for rotating the rear seat bottom 14b, in which the rear seat bottom 14b is in a normal position (a first position)
Figure 13:
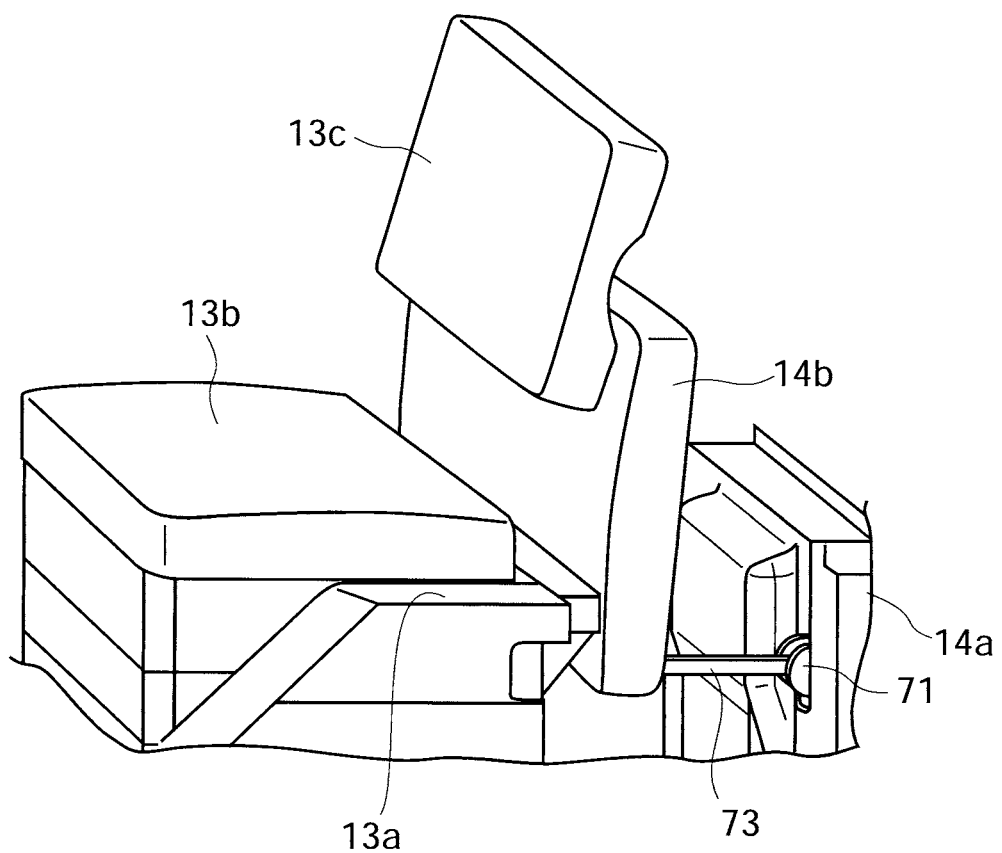
FIG. 13 is a diagram of a schematic perspective view illustrating the rotation mechanism for rotating the rear seat bottom 14b, in which the rear seat bottom 14b is in a retracted position (a second position)
Figure 14:
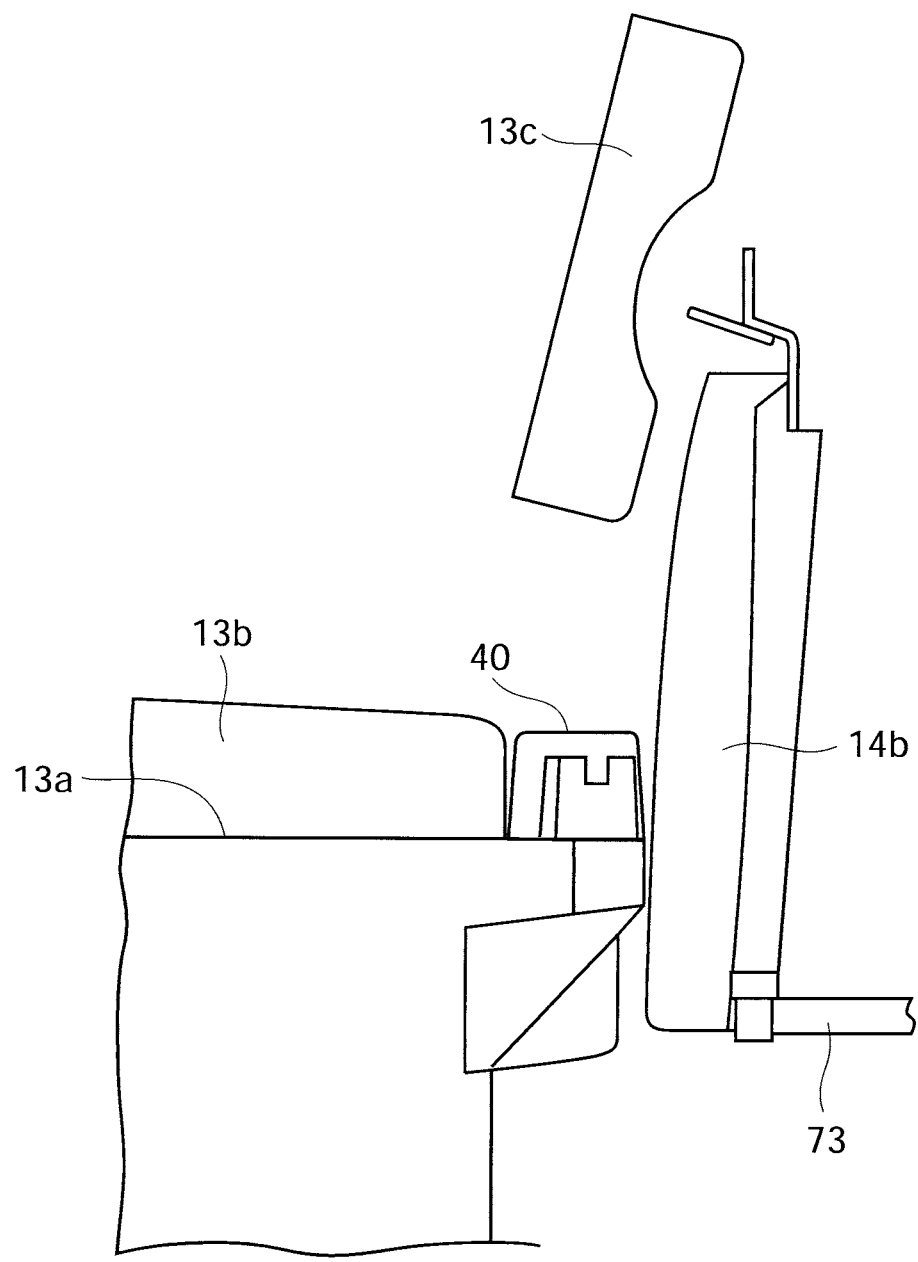
FIG. 14 is a diagram of a schematic side view illustrating a positional relationship between the rear seat bottom 14b in the retracted position and the drink holder 40.

Next, with reference to FIGS. 12 to 14, a rotation mechanism configured to rotate the rear seat bottom 14*b* (a retraction mechanism configured to retract the rear seat bottom 14*b* toward the front side) is explained. FIGS. 12 and 13 are schematic perspective views illustrating a normal position (a use position) and a retracted position of the rear seat bottom 14*b*, respectively. In FIGS. 12 and 13, the retractor R1 and the drink holder 40 are omitted to illustrate a positional relationship between the rear seat bottom 14*b* and the front seat 13. FIG. 14 is a schematic side view illustrating the retracted position of the rear seat bottom 14*b*. In FIG. 14, the retractor R1 is omitted to illustrate a positional relationship between the rear seat bottom 14*b* and the drink holder 40.

As illustrated in FIGS. 12 to 14, the rear seat bottom 14*b* is attached to a rotatable arm 73 that is rotatably mounted to the rear seat base 14*a*. Specifically, a proximal end of the rotatable arm 73 is rotatably attached to a hinge 71 provided on a front wall portion of the rear seat base 14*a*, and the rear seat bottom 14*b* is fixed to a distal end of the rotatable arm 73. With this configuration, the rear seat bottom 14*b* can be rotated between the normal position (the use position) illustrated in FIG. 12 and the retracted position illustrated in FIG. 13. As illustrated in FIG. 13, in the state where the rear seat bottom 14*b* is positioned in the retracted position thereof, the rear seat bottom 14*b* is located close to the front seat bottom 13*b* and the front seat back 13*c*. That is, as illustrated in FIG. 14, in the state where the rear seat bottom 14*b* is positioned at the retracted position, the rear seat bottom 14*b* is close to the drink holder 40, but does not come in contact with the rear end of the drink holder 40 (i.e., the edges of the rear side cutouts 41*cr* and 42*cr*) of the drink holder 40.

(Effects)

Effects of one or more embodiments described above are described below.

According to an embodiment described above, the drink holder 40 is fixed to the portion of the upper surface of the front seat base 13*a* on the rear side of the front seat bottom 13*b*. Therefore, unlike a case where a drink holder is attached to the rear surface of the front seatback 14*b*, the drink holder 40 can be prevented from interfering with the rear seat passengers when the rear seat passengers move. In particular, even in a case where the aisle 21*b* for the rear seat passengers is narrow, such as in the utility vehicle 1, it is possible to prevent the drink holder 40 from interfering with the rear seat passengers when the rear seat passengers move around.

According to an embodiment described above, the rear end 40*r* of the drink holder 40 is located on the front side of the rear end 13*cr* of the front seat back 13*c* (see FIG. 7). Accordingly, it is more reliably to prevent the drink holder 40 from interfering with the rear seat passengers when the rear seat passengers move.

According to an embodiment described above, in the front-rear direction, the front ends of the tubular holder portions 41 and 42 of the drink holder 40 are located on the front side of the front end 13*cf* of the front seat back 13*c* (see FIG. 7). With this configuration, the front seat passengers can easily access the drink held in the drink holder 40 for the rear seat passengers through the gap between the front seat bottom 13*b* and the front seat back 13*c*. Therefore, the drink holder 40 can be shared by the rear seat passengers and the front seat passengers, which can further facilitate user convenience.

According to an embodiment described above, the upper end 40*t* of the drink holder 40 is provided lower than the uppermost position of the upper surface of the front seat bottom 13*b*. Further, the upper end 40*t* of the drink holder 40 is provided lower than the rear end of the upper surface of the front seat bottom 13*b*. Accordingly, the drink holder 40 does not protrude higher than the upper surface of the front seat bottom 13*b*, which prevents the passengers from unintentional collisions with the drink holder 40.

According to an embodiment described above, the drink holder 40 is located in the middle portion (more specifically, in the center portion) of the vehicle body 1 in the vehicle width direction. Accordingly, the drink holder 40 can be shared by the passengers on the left and right sides of the rear seat, which can improve convenience.

According to an embodiment described above, a part of the drink holder 40 is overlapped with at least one of the front seat belt retractors R1, R2, and R3, in view along the vehicle width direction. Therefore, an unused region of the space for placing the front seat belt retractors R1, R2, and R3 can be effectively utilized.

According to an embodiment described above, the drink holder 40 has one or more tubular holder portions 41 and 42 each of which includes the upper end opening and the lower end opening thereof. That is, each of the one or more tubular holder portions 41 and 42 does not have a bottom wall protruding inwardly from the vicinity of the lower end opening thereof. Since each of the tubular holder portions 41 and 42 is formed with no bottom wall, it is possible to reduce the amount of material used for the drink holder 40, as well as to contribute to reducing the weight of the drink holder 40.

According to an embodiment described above, since each of the holder portions 41 and 42 is formed with no bottom wall, it is possible to prevent liquid from being accumulated in each of the holder portions 41 and 42. In particular, in the vehicle 1 without a roof as in an embodiment described above, it is conceivable that a large amount of liquid such as rainwater or car wash water may enter in the cabin. However, such liquid can be prevented from remaining in the holder portions 41 and 42 for a long period of time since the tubular holder portions 41 and 42 are formed with no bottom wall.

Further, according to an embodiment described above, each of the tubular holder portions 41 and 42 includes, at the lower end portion of the circumferential wall thereof, the cutout 41*cf*, 41*cr*, 42*cf*, 42*cr*. Accordingly, it is possible to more reliably preventing liquid from remaining in the holder portions 41 and 42 for a long time.

According to an embodiment described above, each of the tubular holder portions 41 and 42 of the drink holder 40 is formed in the tapered shape in which the diameter thereof is gradually widened from the upper end opening to the lower end opening thereof, and each of the tubular holder portions 41 and 42 has the front side cutout 41*cf*, 42*cf* and the rear side cutout 41*cr*, 42*cr*. This shortens the sizes of the tubular holder portions 41 and 42 in the front-back direction, allowing the drink holder to be placed in an even smaller space.

According to an embodiment described above, in the state where the rear seat bottom 14*b* is in the retracted position thereof (see FIG. 14), the rear seat bottom 14*b* does not come into contact with the rear end of the drink holder 40. In other words, in the retracted position of the rear seat bottom 14*b*, the rear seat bottom 14*b* (the front end of the rear seat bottom 14*b*) is located on the rear side of the rear end of the drink holder 40 and thus does not contact with the drink holder 40. As a result, even in the configuration in which the drink holder 40 is provided on the rear side of the front seat bottom 13*b*, it is possible to prevent the drink holder 40 from interfering with the rear seat bottom 14*b* in the retracted position of the rear seat bottom 14*b*.

According to an embodiment described above, the drink holder 40 includes the two or more tubular holder portions 41 and 42 and the connection portion 43 connecting adjacent two of the two or more tubular holder portions 41 and 42, such that the fixation portion (e.g., screw hole) configured to fix the drink holder 40 to the front seat base 13*a* is provided in the connection portion 43. Therefore, there is no need to separately provide a fixation portion to fix the drink holder 40, which may contribute to weight reduction of the drink holder 40.

Further, according to an embodiment described above, the drink holder 40 including the one or more tubular holder portions 41 and 42 is integrally formed with the device holder portion 51 configured to hold electronic devices. Therefore, the number of parts is reduced compared to a case where a drink holder and a device holder are provided separately. This can facilitate parts management, etc. during vehicle manufacturing.

Further, according to an embodiment described above, the container-like device holder portion 51 of the drink holder 40 includes one or more drain holes 58, 59 (see FIG. 11) at the bottom wall thereof. This can prevent objects (such as electronic devices) held in the device holder portion 51 from being soaked in liquid (such as rainwater or the like).

Further, according to an embodiment described above, the bottom wall 56 of the device holder portion 51 includes the first bottom wall portion 56*b* at the first height and the second bottom wall portion 56*c* at the second height lower than the first height, and the second bottom wall portion 56*c* includes one or more drain holes 58 (see FIG. 11). This can more reliably prevent objects (such as electronic devices) held in the device holder portion 51 from being soaked in liquid (such as rainwater or the like).

Further, according to an embodiment described above, the device holder portion 51 includes one or more drain holes 58 and 59 at or in the vicinity of the boundary between the bottom wall 56 and the side walls (see FIG. 11). With this configuration, liquid such as water that has fallen along the side wall can be discharged immediately below the side wall. Accordingly, it is possible to easily prevent the liquid from being accumulated on the bottom wall 56.

Further, according to an embodiment described above, the device holder portion 51 includes the notch 61 which is recessed from the upper edge of the side wall 53 (see FIG. 8). This makes it easier to take out the cable (e.g., a power cable or the like) connected to the electronic device held in the device holder portion 51.

Further, according to an embodiment described above, the side wall 53 formed with the notch 61 is located on the side closer to the cable connection port 63 (e.g., the power outlet 63 or the like) (see FIGS. 2 and 8). This makes it easier to lead (route) the cable (e.g., a power cable, an USB cable, or the like) that is connected to the electronic device held in the device holder portion 51 to the cable connection port 63.

(Modifications)

The invention should not be limited only to embodiments described above, but may include various modifications.

Although an embodiment described above relates to the utility vehicle 1 with the drink holder 40, the disclosure is not limited thereto. For example, a vehicle including a drink holder may be a vehicle other than such a utility vehicle.

In an embodiment described above, the case has been described in which each of the tubular holder portions of the drink holder 40 is formed in the cylindrical shape. However, the disclosure is not limited thereto. For example, the tubular holder portion may have a tubular shape (pentagonal, hexagonal, etc.) other than the cylindrical shape.

In an embodiment described above, the case has been described in which the drink holder 40 includes the two tubular holder portions. However, the disclosure is not limited thereto. For example, the drink holder 40 may have only one tubular holder portion. The drink holder 40 may have three or more tubular holder portions.

In an embodiment described above, the case has been described in which the front ends of the tubular holder portions 41 and 42 of the drink holder 40 is located on the front side of the front end 13*cf* of the front seat back 13*c* (see FIGS. 5 and 7). However, the disclosure is not limited thereto. For example, the front end of the drink holder 40 or the front ends of the tubular holder portions 41 and 42 may be located on the rear side of the front end 13*cf* of the front seat back 13*c*.

In one or more embodiment described above, the case has been described in which the most part of the drink holder 40 is hidden by the front seat back 13*c* when viewed in the vertical direction. However, the disclosure is not limited thereto. For example, the drink holder 40 may be entirely hidden by the front seatback 13*c* when viewed in the vertical direction.

In one or more embodiment described above, the case has been described in which the upper end of the drink holder 40 is located lower than the rear end of the upper surface of the front seat bottom 13b. However, the disclosure is not limited thereto. For example, the upper end of the drink holder 40 may be located higher than the rear end of the upper surface of the front seat bottom 13b or may be located higher than the uppermost point of the upper surface of the front seat bottom 13b.

In one or more embodiment described above, the case has been described in which the drink holder 40 is located in the middle portion of the vehicle in the vehicle width direction. However, the disclosure is not limited thereto. For example, a drink holder may be provided only on the left side of the vehicle in the vehicle width direction, or only on the right side of the vehicle in the vehicle width direction. Also, drink holders may be provided on the left side and the right side of the vehicle in the vehicle width direction.

In one or more embodiment described above, the case has been described in which a part of the drink holder 40 is overlapped with at least one of the front seat belt retractors R1, R2, and R3, in view along the vehicle width direction. However, the disclosure is not limited thereto. For example, the drink holder 40 may not be overlapped with any one of the front seat belt retractors R1, R2, and R3, in view along the vehicle width direction.

In one or more embodiment described above, the case has been described in which each of the tubular holder portions 41 and 42 of the drink holder 40 does not have a bottom wall protruding inwardly from the vicinity of the lower end opening thereof. However, the disclosure is not limited thereto. For example, the tubular holder portion of the drink holder 40 may have a bottom wall.

In an embodiment described above, the case has been described in which each of the tubular holder portions 41 and 42 of the drink holder 40 is formed in the tapered shape whose diameter is gradually widened from the upper end opening to the lower end opening thereof. However, the disclosure is not limited thereto. For example, each of the tubular holder portions 41 and 42 or one of the tubular holder portions 41 and 42 may be formed such that the inner diameter or the outer diameter thereof does not change from the upper end opening to the lower end opening thereof.

In an embodiment described above, the case has been described in which each of the tubular holder portions 41 and 42 of the drink holder 40 includes the front side cutout and the rear side cutout. However, the disclosure is not limited thereto. For example, at least one of the tubular holder portions may have only the front side cutout or only the rear side cutout. Also, at least one of the tubular holder portions may not have the front side cutout nor the rear side cutout. Further, at least one of the tubular holder portions may have a left side cutout and/or a right side cutout, in addition to the front side cutout and the rear side cutout or without the front side cutout and the rear side cutout.

In one or more embodiment described above, the case has been described in which the drink holder 40 is fixed to the vehicle body 1a (the front seat base 13a) by means of the screws S. However, the disclosure is not limited thereto. For example, the drink holder may be fixed to the vehicle body 1a by means of fixing parts other than the screws.

In one or more embodiment described above, the case has been described in which the drink holder 40 is configured such that the tubular holder portions 41 and 42 are integrally formed with the device holder portion 51. However, the disclosure is not limited thereto. For example, the drink holder 40 may not have the device holder portion.

The invention includes other embodiments or modifications in addition to one or more embodiments and modifications described above without departing from the spirit of the invention. One or more embodiments and modifications described above are to be considered in all respects as illustrative, and not restrictive. The scope of the invention is indicated by the appended claims rather than by the foregoing description. Hence, all configurations including the meaning and range within equivalent arrangements of the claims are intended to be embraced in the invention.

The invention claimed is:

1. A vehicle comprising:
a vehicle body including a floor surface, a pair of front pillar members, and a pair of rear pillar members;
a front seat base protruded from the floor surface and including an upper surface thereof on which a front seat bottom is attached, the front seat base being provided between the pair of front pillar members and the pair of rear pillar members in a front-rear direction of the vehicle;
a rear seat base protruded from the floor surface and located on a rear side of the front seat base across an aisle, wherein a rear seat bottom is attached to the rear seat base; and
a drink holder fixed to a portion of the upper surface of the front seat base on a rear side of the front seat bottom.

2. A vehicle comprising:
a vehicle body including a floor surface;
a front seat base protruded from the floor surface and including an upper surface thereof on which a front seat bottom is attached;
a rear seat base protruded from the floor surface and located on a rear side of the front seat base across an aisle, wherein a rear seat bottom is attached to the rear seat base; and
a drink holder fixed to a portion of the upper surface of the front seat base on a rear side of the front seat bottom, wherein
an upper end of the drink holder is located lower than a lower end of a front seat back.

3. The vehicle according to claim 1, wherein
in the front-rear direction of the vehicle, a rear end of the drink holder is located on a front side of a rear end of a front seat back.

4. The vehicle according to claim 1, wherein
in the front-rear direction of the vehicle, a front end of the drink holder is located on a front side of a front end of a front seat back.

5. The vehicle according to claim 1, wherein
more than half of the drink holder is overlapped with a front seat back in view along a vertical direction.

6. The vehicle according to claim 1, wherein
an upper end of the drink holder is provided lower than an uppermost position of an upper surface of the front seat bottom.

7. The vehicle according to claim 1, wherein
an upper end of the drink holder is provided lower than a rear end of an upper surface of the front seat bottom.

8. The vehicle according to claim 1, wherein
the drink holder is located in a middle portion of the vehicle in a vehicle width direction.

9. The vehicle according to claim 1, wherein
at least a part of the drink holder is overlapped with a front seat belt retractor, in view along a vehicle width direction.

10. The vehicle according to claim 1, wherein
the drink holder includes a tubular holder portion including an upper end opening and a lower end opening and configured to hold a beverage container.

11. The vehicle according to claim 1, wherein
the drink holder includes a tubular holder portion including an upper end opening and a lower end opening and configured to hold a beverage container, and
the tubular holder portion has a tapered shape in which a diameter thereof is gradually enlarged from the upper end opening to the lower end opening thereof.

12. The vehicle according to claim 11, wherein
the tubular holder portion includes a cutout at at least one of a front lower end portion and a rear lower end portion of the tubular holder portion.

13. The vehicle according to claim 11, wherein
the tubular holder portion includes a front cutout at a front lower end portion of the tubular holder portion and a rear cutout at a rear lower end portion of the tubular holder portion.

14. The vehicle according to claim 1, wherein
the drink holder includes two or more tubular holder portions each of which includes an upper end opening and a lower end opening for holding a container,
adjacent two of the two or more tubular holder portions are connected, at edges of lower end openings thereof, with a connection portion, and
the connection portion includes a fixation portion configured to fix the drink holder to the front seat base.

15. The vehicle according to claim 1, wherein
the drink holder includes one or more tubular holder portions to hold a container, each of the one or more tubular holder portions including an upper end opening and a lower end opening, and
the one or more tubular holder portions are integrally formed with a device holder portion configured to hold an electronic device.

16. A vehicle comprising:
a vehicle body including a floor surface;
a front seat base protruded from the floor surface and including an upper surface thereof on which a front seat bottom is attached;
a rear seat base protruded from the floor surface and located on a rear side of the front seat base across an aisle, wherein a rear seat bottom is attached to the rear seat base; and
a drink holder fixed to a portion of the upper surface of the front seat base on a rear side of the front seat bottom, wherein
the rear seat bottom is attached to a rotatable arm rotatably attached to the rear seat base such that the rear seat bottom is rotatable between a first position above the rear seat base and a second position close to the front seat base, and
in the second position of the rear seat bottom, a front end of the rear seat bottom is located on a rear side of a rear end of the drink holder.

17. The vehicle according to claim 1, wherein
the drink holder includes a holder portion including an upper end opening to hold a container such that the upper end opening of the holder portion is located upper than a lower end of the rear seat bottom.

18. The vehicle according to claim 1, wherein
the drink holder includes a holder portion including an upper end opening to hold a container such that more than half of the upper end opening of the holder portion of the drink holder is overlapped with a front seat back in view along a vertical direction.

19. The vehicle according to claim 1, wherein
the vehicle body includes the floor surface, the pair of front pillar members, the pair of rear pillar members, and a pair of middle pillar members between the pair of front pillar members and the pair of rear pillar members, and
the front seat base is provided between the pair of middle pillar members in a vehicle widthwise direction.

20. A vehicle comprising:
a vehicle body including a floor surface;
a front seat base protruded from the floor surface and including an upper surface thereof on which a front seat bottom is attached;
a rear seat base protruded from the floor surface and located on a rear side of the front seat base across an aisle, wherein a rear seat bottom is attached to the rear seat base and wherein at least one of a left side and a right side of the vehicle body includes a rear seat passenger opening to the aisle between the front seat base and the rear seat base; and
a drink holder fixed to a portion of the upper surface of the front seat base on a rear side of the front seat bottom.

* * * * *